(12) United States Patent
Kuroda (10) Patent No.: US 10,046,672 B2
(45) Date of Patent: Aug. 14, 2018

(54) SEAT SLIDE DEVICE FOR VEHICLE

(71) Applicant: TF-METAL Co., Ltd., Kosai-shi, Shizuoka (JP)

(72) Inventor: Shunsuke Kuroda, Shizuoka (JP)

(73) Assignee: TF-METAL Co., Ltd., Kosai-Shi (JP)

( * ) Notice: Subject to any disclaimer, the term of this patent is extended or adjusted under 35 U.S.C. 154(b) by 364 days.

(21) Appl. No.: 14/821,833

(22) Filed: Aug. 10, 2015

(65) Prior Publication Data

US 2016/0039313 A1 Feb. 11, 2016

(30) Foreign Application Priority Data

Aug. 11, 2014 (JP) ................................. 2014-163330
Jun. 16, 2015 (JP) ................................. 2015-120861

(51) Int. Cl.
*B60N 2/07* (2006.01)
*B60N 2/06* (2006.01)
*B60N 2/075* (2006.01)

(52) U.S. Cl.
CPC ........... *B60N 2/0722* (2013.01); *B60N 2/067* (2013.01); *B60N 2/07* (2013.01); *B60N 2/0705* (2013.01); *B60N 2/075* (2013.01); *B60N 2/0715* (2013.01)

(58) Field of Classification Search
CPC .. B60N 2/0705; B60N 2/0715; B60N 2/0722; B60N 2/0818; B60N 2/07; B60N 2/075
USPC .................. 248/429, 430; 384/34; 297/344.1
See application file for complete search history.

(56) References Cited

U.S. PATENT DOCUMENTS

| | | | | |
|---|---|---|---|---|
| 5,575,564 A * | 11/1996 | Harmon | ................... | B60N 2/06 384/34 |
| 5,707,035 A * | 1/1998 | Kargol | ................. | B60N 2/0232 248/429 |
| 6,352,312 B1 * | 3/2002 | Rees | ...................... | B60N 2/071 248/429 |
| 6,772,985 B2 * | 8/2004 | Lee | ........................ | B60N 2/071 248/424 |
| 6,848,664 B2 * | 2/2005 | Ito | ........................ | B60N 2/0232 248/429 |
| 6,886,797 B2 * | 5/2005 | McCullen | .............. | B60N 2/071 248/424 |

(Continued)

FOREIGN PATENT DOCUMENTS

| | | |
|---|---|---|
| CN | 101130347 A | 2/2008 |
| CN | 203727204 U | 7/2014 |

(Continued)

OTHER PUBLICATIONS

The Official Action dated Mar. 22, 2017 in the counterpart Chinese patent application.
European search report dated Jan. 8, 2016 in the counterpart European patent application.

*Primary Examiner* — Stanton L Krycinski
*Assistant Examiner* — Taylor L Morris
(74) *Attorney, Agent, or Firm* — Metrolexis Law Group, PLLC (57) ABSTRACT

A seat slide device for a vehicle includes a lower rail mounted on a vehicle floor, an upper rail mounted on an underside of a seat part, and a friction reducing member arranged between the lower rail and the upper rail. The friction reducing member includes sliding contact members. Each of the sliding contact members includes a lower column part, an upper column part, and connection parts which connect the upper column part with the lower column part.

8 Claims, 11 Drawing Sheets

(56) References Cited

U.S. PATENT DOCUMENTS

| | | | | |
|---|---|---|---|---|
| 7,604,214 B2* | 10/2009 | Kojima | | B60N 2/0705 248/430 |
| 7,669,826 B2* | 3/2010 | Hayakawa | | B60N 2/0705 248/429 |
| 8,052,111 B2* | 11/2011 | Bernhardt | | B60N 2/0715 248/429 |
| 8,245,994 B2* | 8/2012 | Yamada | | B60N 2/073 248/424 |
| 8,251,336 B2* | 8/2012 | Kimura | | B60N 2/0705 248/424 |
| 8,556,222 B2* | 10/2013 | Yamada | | B60N 2/0705 248/429 |
| 2005/0145768 A1* | 7/2005 | Rohee | | B60N 2/0705 248/430 |
| 2012/0006963 A1 | 1/2012 | Yoshida et al. | | |
| 2012/0205512 A1* | 8/2012 | Fujishiro | | B60N 2/0705 248/429 |
| 2012/0299352 A1* | 11/2012 | Line | | B60N 2/0732 297/344.1 |
| 2016/0101712 A1* | 4/2016 | Hagan | | B60N 2/0722 248/429 |

FOREIGN PATENT DOCUMENTS

| | | |
|---|---|---|
| DE | 10156805 A1 | 10/2002 |
| EP | 1892145 A2 | 2/2008 |
| EP | 1892145 A3 | 5/2009 |
| JP | 2005-263049 A | 9/2005 |
| JP | 2006-168589 A | 6/2006 |
| JP | 2010-105618 A | 5/2010 |
| WO | 2006/075815 A1 | 7/2006 |
| WO | 2012/011315 A1 | 1/2012 |

* cited by examiner

SEAT SLIDE DEVICE FOR VEHICLE

CROSS REFERENCE TO RELATED APPLICATIONS

The present application is based on, and claims priority from Japanese Patent Applications No. 2014-163330, filed Aug. 11, 2014, and No. 2015-120861, filed Jun. 16, 2015, the disclosure of all of which is hereby incorporated by reference herein in its entirety.

TECHNICAL FIELD

The present application relates to a seat slide device for a vehicle, which enables a seat to be moved in a front-rear direction of the vehicle and fixed in a desired position by a seating passenger.

BACKGROUND

For such a seat slide devices for a vehicle, there exist a manual seat slide device which can be locked or unlocked by a seating passenger manually to move an unlocked seat to a desired position in a front-rear direction of the vehicle and an electrical seat slide device which moves a seat to a desired position in the front-rear direction of the vehicle by forward and reverse rotations of a motor. Again, each of the manual seat slide device and the electrical seat slide device includes a lower rail fixed to a vehicle body, an upper rail fixed on an under face of a seat and adapted so as to be movable with respect to the lower rail in the longitudinal direction and, a friction reducing member for reducing friction between the lower rail and the upper rail.

In a seat slide device of the conventional example, either a resinous shown in JP 2006-168589 A or guide balls rotatably supported by a retainer shown in JP 2010-105618 A is mainly employed as the friction reducing member.

SUMMARY

In the seat slide device of the conventional example, however, as the upper rail and lower rail have their profiles established in correspondence with the constitution of a so-employed friction reducing member, there exists no compatibility between one rail corresponding to the resinous slider and another rail corresponding to the guide balls.

Under the above-mentioned situation, an object of the present application is to provide a seat slide device for a vehicle, which can reduce the types of upper and lower rails to be managed since the friction reducing members different in constitution are compatible with each other.

A seat slide device for a vehicle according to an aspect of the present application includes a lower rail, an upper rail, and a friction reducing member. The lower rail includes a lower bottom wall having a rectangular shape extending in a front-rear direction of the vehicle, a pair of lower sidewalls standing from both edges of the lower bottom wall in a width direction of the vehicle upwardly through lower downside circular parts, a pair of lower top walls each extending from an upper edge of each of the lower sidewalls toward the opposing lower sidewall through a lower upside circular part formed by a circular surface, substantially in parallel with the lower bottom wall and lower inner walls suspending from inner edges of the lower top walls downwardly. The upper rail includes an upper top wall having a rectangular shape extending in the front-rear direction of the vehicle, a pair of upper sidewalls suspending from both edges of the upper top wall in the width direction of the vehicle downwardly, a pair of upper downside inclined walls standing from lower edges of the upper sidewall obliquely upward and outward and a pair of upper upside inclined walls standing from top edges of the upper downside inclined walls toward the upper sidewalls obliquely upward, wherein the upper downside inclined walls and the upper upside inclined walls are arranged so as to be movable in the lower rail along the front-rear direction of the vehicle under condition that the upper downside inclined walls face the lower downside circular parts, while the upper upside inclined walls are facing the lower upside circular parts. The friction reducing member is arranged between the lower rail and the upper rail. The friction reducing member includes one or more sliding contact members. Each of the sliding contact members includes a lower column part consisting of a columnar member arranged between the lower downside circular part and the upper downside inclined wall along a longitudinal direction, an upper column part consisting of a columnar member arranged between the lower upside circular part and the upper upside inclined wall along the longitudinal direction and one or more connection parts connecting the upper column part with the lower column part.

By arranging the lower column part between the lower downside circular part and the upper downside inclined wall along the longitudinal direction and also arranging the upper column part between the lower upside circular part and the upper upside inclined wall along the longitudinal direction, the sliding contact member as the friction reducing member can be employed for the upper rail and the lower rail corresponding to guide balls. Consequently, since the friction reducing members different in constitution have compatibility, it is possible to reduce the types of the lower rail and the upper rail to be managed.

The friction reducing member may be formed, between the lower column part and the upper column part, with a slit in the form of an elongated hole along the longitudinal direction.

By providing the slit, the lower column part and the upper column part bend in the region of the slit, so that variation in the clearance between the lower downside circular part and the lower upside circular part of the lower rail is absorbed. Thus, it is possible to further reduce the sliding resistance.

The slit may be formed so as to be the elongated hole by at least a pair of the connection parts connecting the upper column part with the lower column part.

By providing the slit between the lower column part and the upper column part, both column parts become possible to be deflected, allowing the interval between both column parts to be adjusted.

The lower column part may be formed, at its region abutting on the upper downside inclined wall, with a plurality of first friction reducing dents which are dented so as to depart from the upper downside inclined wall, at predetermined intervals along the longitudinal direction, and the upper column part may be formed, at its region abutting on the upper upside inclined wall, with a plurality of second friction reducing dents which are dented so as to depart from the upper upside inclined wall, at predetermined intervals along the longitudinal direction.

By providing the first and second friction reducing dents in the region of the sliding contact member abutting on the upper rail, the contact area between the sliding contact member and the upper rail can be reduced. As a result, it is possible to promote the reduction of the sliding resistance.

The friction reducing member may be formed with a length less than a half of the dimension of the lower rail in the longitudinal direction and also arranged in front and rear pairs in the longitudinal direction of the lower rail.

By forming one friction reducing member with a length less than a half of the dimension of the lower rail in the longitudinal direction, it is possible to arrange common friction reducing member in the lower rail at its front/rear/right/left positions, and thus it is possible to apply this friction member to various lower rails. Consequently, it becomes possible to provide one kind of slider allowing suitability to lower rails having various total lengths, thereby realizing the commonality of components.

The friction reducing member may be provided with a fitting part and a restriction protrusion both protruding toward the lower sidewall, and the lower sidewall may be provided with a through-hole fittable to the fitting part and a restriction hole fittable to the restriction protrusion.

With the structure where the assembling of the friction reducing member to the lower rail is effected by fitting the fitting part to the through-hole and fitting the restriction protruding to the restriction hole, it is possible to improve the assembling workability.

The fitting part may include an L-shaped protrusion extending in the longitudinal direction of the lower rail; the through-hole may be a hole which penetrates through the lower sidewall and into which the fitting part can be fittingly inserted; and by sliding the friction reducing member with the fitting part inserted into the through-hole, in the longitudinal direction of the lower rail, the L-shaped fitting part may be engaged with a marginal part of the through-hole, while the restriction protrusion is fittably opposed to the restriction hole.

With the structure where the assembling of the friction reducing member to the lower rail is effected by fittingly inserting the L-shaped protrusion into the through-hole, it is possible to exhibit superior assembling workability with such a relatively simple structure and also possible to prevent the fall of the friction reducing member. Additionally, as the movement of the friction reducing member after assembling can be prevented by the restriction protrusion fittingly inserted into the restriction hole, it is possible to prevent the fall of the friction reducing member with a relatively simple structure.

Preferably, the restriction protrusion and the fitting part are set so that their dimensions in the longitudinal direction of the lower rail are substantially equal to each other.

As the movement of the friction reducing member after assembling can be prevented by the restriction protrusion fittingly inserted into the restriction hole, it is possible to prevent the fall of the friction reducing member with a relatively simple structure.

It is desirable that the radius of the lower column part is set smaller than the curvature radius of the lower downside circular part, and a contact point between the lower downside circular part and the lower column part, a center of the lower column part and a contact point between the lower column part and the upper downside inclined wall are positioned in alignment with each other. It is desirable that the radius of the upper column part is set smaller than the curvature radius of the lower upside circular part, and a contact point between the lower upside circular part and the upper column part, a center of the upper column part and a contact point between the upper column part and the upper upside inclined wall are positioned in alignment with each other. It is desirable that a connection point between the connection part and the lower column part and a connection point between the connection part and the upper column part are distant from the lower sidewall.

With the structure where the lower column part has its radius set smaller than the radius of the lower downside circular part of the lower rail; the upper column part has its radius set smaller than the radius of the lower upside circular part of the lower rail; and the connection point between the connection part and the lower column part and the connection point between the connection part and the upper column part are distant from the lower sidewall, variation in the clearance between the lower rail and the upper rail can be absorbed since the connection points are bent and deformed. Additionally, since the contact point between the lower downside circular part and the lower column part, the center of the lower column part and the contact point between the lower column part and the upper downside inclined wall are positioned in alignment with each other and furthermore, the contact point between the lower upside circular part and the upper column part, the center of the upper column part and the contact point between the upper column part and the upper upside inclined wall are positioned in alignment with each other, the upper rail can slide in the lower rail without rattling and with stability. Again, since the connection point between the connection part and the lower column part and the connection point between the connection part and the upper column part are distant from the lower sidewall, the lower column part and the upper column part can contact the lower downside circular part and the lower upside circular part at only the contact points, respectively. Therefore, even if the radial dimensions of these column parts and circular parts vary, the positions of the above contact points would be stabilized to allow the above-mentioned effect to be realized.

The upper column part may be formed, behind its region abutting on the upper upside inclined wall, with an elastic adjustment part consisting of a recess.

Owing to the provision of the elastic adjustment part, the region of the upper column part abutting on the upper upside inclined wall becomes possible to be deformed elastically. Then, since the upper column part is elastically deformed in accordance with the clearance between the upper rail and the upside circular part of the lower rail, the deflection of the upper rail is mitigated to reduce the sliding resistance of the upper rail. Consequently, as the selective assembling of the friction reducing member in accordance with the clearance between the upper rail and the upside circular part of the lower rail can be abolished, it is possible to reduce the types of friction reducing members to be managed and abolish the process of selecting an appropriate friction reducing member.

DESCRIPTION OF THE EMBODIMENTS (First Embodiment)

A seat slide device for vehicle according to a first embodiment will be described with reference to FIGS. 1 to 3.

Figure 1:
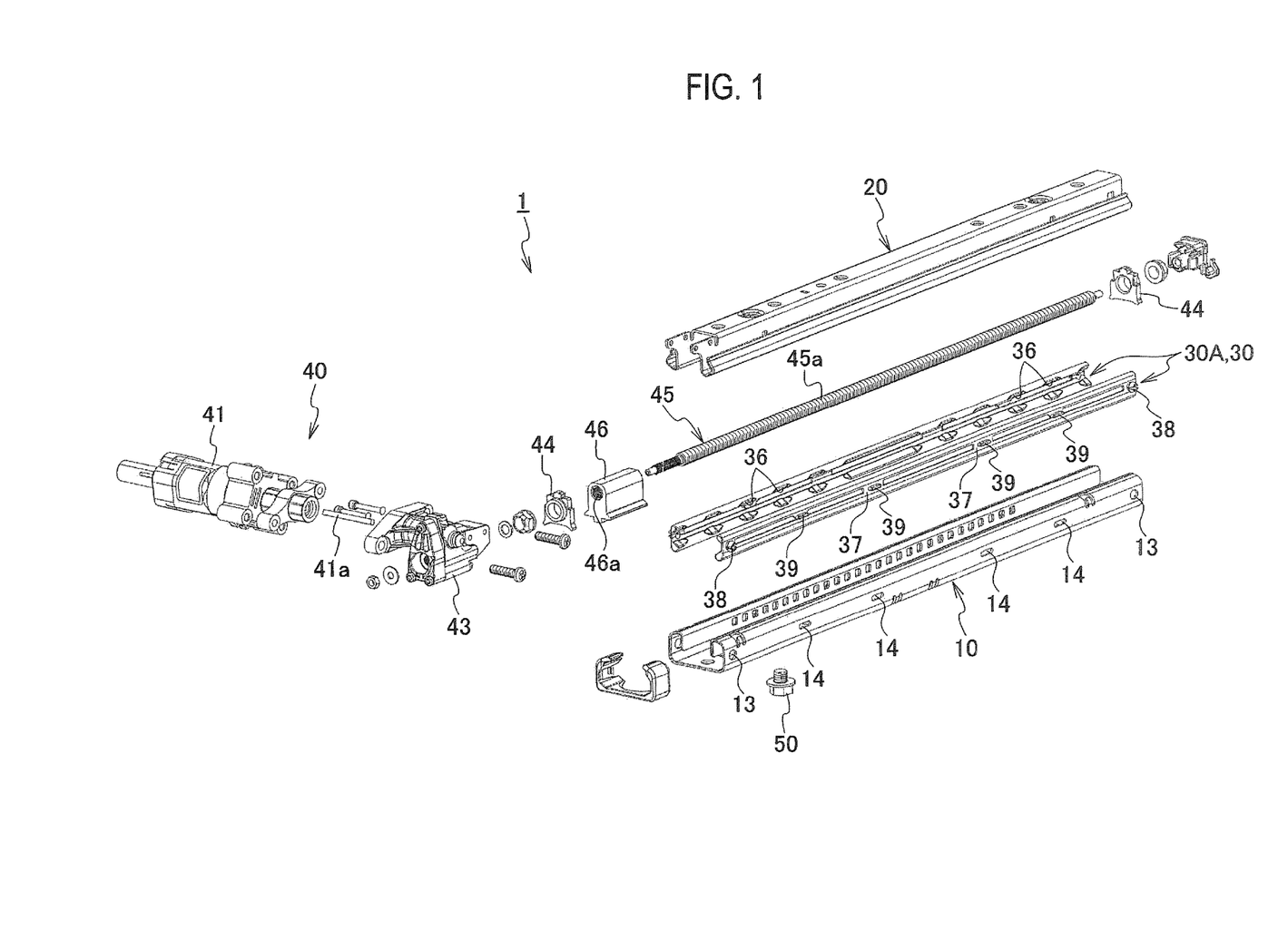
FIG. 1 is an exploded perspective view illustrating a seat slide device according to a first embodiment where sliding contact members are employed as the friction reducing member.
Figure 2:
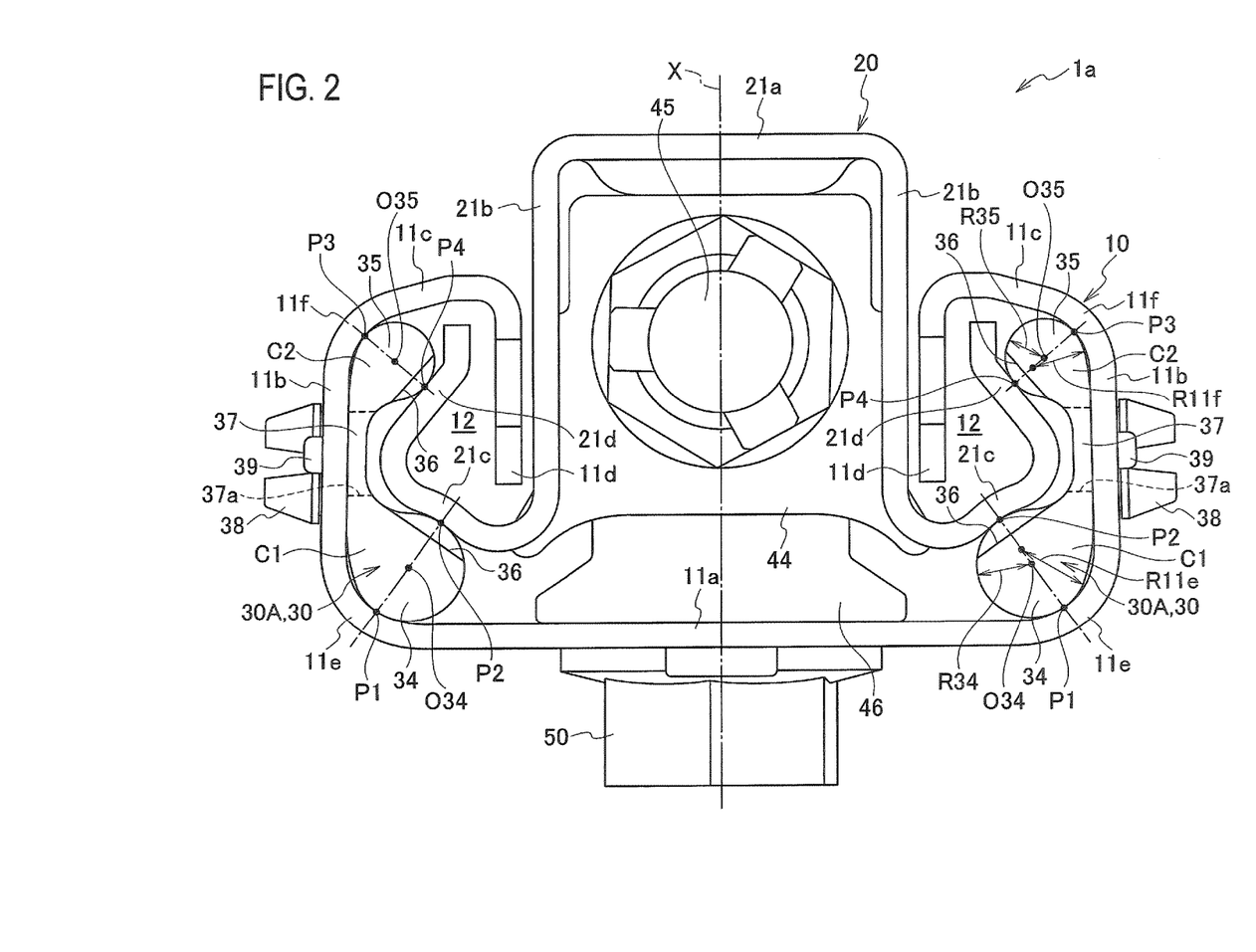
FIG. 2 is a side view of an assembly where the sliding contact members are employed as the friction reducing member, illustrating the seat slide device according to the first embodiment.
Figure 3:
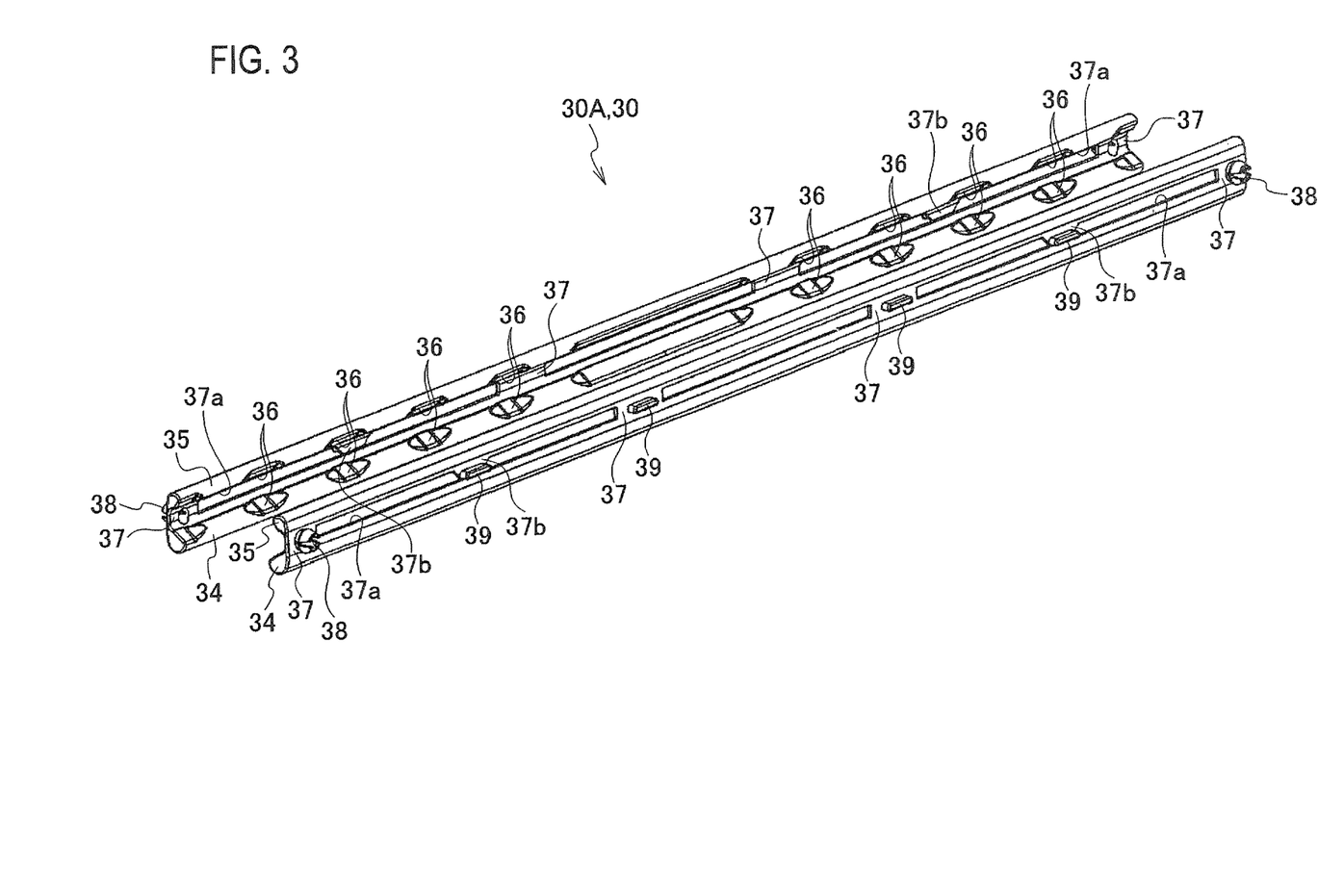
FIG. 3 is a perspective view illustrating a pair of the sliding contact members of the seat slide device according to the first embodiment.

As illustrated in FIGS. 1 to 3, the seat slide device for vehicle according to the first embodiment is an electric seat slide device 1 equipped with a motor 41 as a driving source. The seat slide device 1 includes a lower rail 10 mounted on a vehicle floor to extend along a front-rear direction of a vehicle, an upper rail 20 mounted on an underside face of a seat part (not illustrated) so as to be movable in the lower rail 10 along the longitudinal direction of the lower rail 10, a friction reducing member 30 arranged between the lower rail 10 and the upper rail 20, and a drive unit 40 for moving the upper rail to a desired position by a passenger's manipulation. A pair of assemblies 1a each having the upper rail 20 and the friction reducing member 30 assembled on the lower rail 10 are arranged between the seat part and the floor face, in parallel with each other along the front-rear direction of the vehicle. The assemblies 1a are associated with each other by the drive unit 40.

The lower rail 10 includes a lower bottom wall 11a in the shape of a rectangular plate extending in the front-rear direction of the vehicle, a pair of lower sidewalls 11b standing from both edges of the lower bottom wall 11a in a width direction of the vehicle upwardly, a pair of lower top walls 11c each extending from an upper edge of each lower sidewall 11b toward the opposing lower sidewall 11b substantially in parallel with the lower bottom wall 11a, and a pair of lower inner walls 11d suspending from respective inner edges of the lower top walls 11c toward the lower bottom wall 11a downwardly. The interval between the parallel-opposing lower inner walls 11d is set so as to allow for the movement of the upper rail 20 accommodated in the lower rail 10.

The lower bottom wall 11a and the respective lower sidewalls 11b continue smoothly, through respective lower downside circular parts 11e formed by arc surfaces. Also, the respective lower sidewalls 11b connect with the respective lower top wall 11c by lower upside circular parts 11f formed by arc surfaces, smoothly. The lower bottom wall 11a, which serves as a lower fixed part when fixing on the vehicle floor, is fixed on the vehicle floor by lower bolts (not illustrated).

In the lower rail 10, respective portions have dimensions established so that the cross sectional shape of the lower rail 10 is linear symmetrical with a symmetrical axis X perpendicular to the lower bottom wall 11a. Since the cross sectional shape of the lower rail 10 is linear symmetrical with the symmetric axis X, one end face at the front end of the lower rail and another end face at the rear end of the lower rail are formed to the same shape. In the seat slide device 1, a required sliding amount differs depending on the model of vehicle and specifications and therefore, the whole length of the lower rail 10 is set according to the sliding amount. Accordingly, the manufacturer manages several kinds of lower rails 10 having different whole lengths with the same cross sectional shape.

The upper rail 20 includes an upper top wall 21a in the shape of a rectangular plate extending in the front-rear direction of the vehicle, a pair of upper sidewalls 21b suspending from both edges of the upper top wall 21a in the vehicle width direction downwardly, a pair of upper downside inclined walls 21c each standing from a lower edge of each upper sidewall 21b obliquely upward and outward, and a pair of upper upside inclined walls 21d standing from respective top edges of the upper downside inclined walls 21c toward the upper sidewalls 21b obliquely upward. The upper top wall 21a, which serves as an upper fixed part when fixing on the backside of the seat part, is fixed on the back side of the seat part by upper bolts (not illustrated).

In the upper rail 20, respective portions have dimensions established so that the upper downside inclined walls 21c and the upper upside inclined walls 21d can move in the lower rail 10 along the front-rear direction of the vehicle.

In the first embodiment, the friction reducing member 30 includes sliding contact members 30A each formed by injection molding resinous material. By injection molding resinous material, each of the sliding contact members 30A is formed into one body. Each of the sliding contact members 30A includes a lower column part 34 composed of a columnar member and an upper column part 35 composed of a columnar member having a diameter smaller than that of the lower column part 34. The lower column part 34 is arranged between the lower downside circular part 11e and the upper downside inclined wall 21c along the longitudinal direction. The upper column part 35 is arranged between the lower upside circular part 11f and the upper upside inclined wall 21d along the longitudinal direction. The lower column part 34 is formed, at its region abutting on the opposing upper downside inclined wall 21c, with a plurality of friction reducing dents 36 dented so as to depart from the upper downside inclined wall 21c, at predetermined intervals along the longitudinal direction. The upper column part 36 is also formed, at its region abutting on the opposing upper upside inclined wall 21d, with a plurality of friction reducing dents 36 dented so as to depart from the upper upside inclined wall 21d, at similar intervals to those of the lower column part 34, along the longitudinal direction.

The radius R34 of the lower column part 34 is set smaller than the curvature radius R11e of the lower downside circular part 11e of the lower rail 10. The radius R35 of the upper column part 35 is set smaller than the curvature radius R11f of the lower upside circular part 11f of the lower rail 10. A connection point C1 between a connection part 37 and the lower column part 34 and a connection point C2 between the connection part 37 and the upper column part 35 are distant from the lower sidewall 11b.

A contact point P1 between the lower downside circular part 11e and the lower column part 34, a center O34 of the lower column part 34, and a contact point P2 between the lower column part 34 and the upper downside inclined wall 21c are in alignment with each other. A contact point P3 between the lower upside circular part 11f and the upper column part 35, a center O35 of the upper column part 35 and a contact point P4 between the upper column part 35 and the upper upside inclined wall 21d are in alignment with each other.

The lower column part 34 and the upper column part 35 are connected with each other by a plurality of connection parts 37. Slits 37a in the form of elongated holes along the longitudinal direction of the sliding contact member 30A are formed between the lower column part 34 and the upper column part 35. With the lower column part 34 and the upper column part 35 bending in the region of the slits 37a, variations in the clearance between the lower downside circular part 11e and the upper downside inclined wall 21c and the clearance between the lower upside circular part 11f and the upper upside inclined wall 21d are absorbed. At the intermediate part of the slit 37a, a restriction pedestal 37b is formed to extend from the upper column part 35 toward the lower column part 34. On the sides of the connection part 37 and the restriction pedestal 37b opposed to the lower sidewall 11b, either a fixing claw 38 (fitting part) or a restriction protrusion 39 is formed so as to protrude against the lower sidewall 11b. The fixing claws 38 are allocated to the connection parts 37 positioned on both ends of the lower rail 10, while the restriction protrusions 39 are allocated to the remaining connection parts 37 and the restriction pedestals 37b.

The fixing claw 38 is composed of an engaging claw having elasticity. Since the fixing claws 38 are fittingly inserted into fixing holes 13 as through-holes penetrating through the lower sidewall 11b, the sliding contact member 30A is fixed onto the lower sidewall 11b. The restriction protrusion 39 is composed of a protrusion having a rectangular cross section. Since the restriction protrusions 39 are inserted into restriction holes 14 penetrating through the lower sidewall 11b and engaged with the lower sidewall 11b in the direction along its wall surface, the displacement of the sliding contact member 30A is restricted. The fixing hole 13 and the restriction hole 14 are set so that their respective dimensions in the longitudinal direction of the lower rail are substantially equal to each other.

The drive unit 40 includes a motor 41 serving as a driving source to generate a driving force, a reduction mechanism 43 arranged on one end of each upper rail 20 to reduce the rotating speed of an output shaft 41a of the motor 41, a screw shaft 45 pivotally supported in the upper rail 20 through shaft supporting plates 44 so as to be rotatable about a shaft's axis and also formed with male screws around the axis and a female-screw member 46 fixed to the lower rail 10 by a fixing bolt 50 under condition that a female screw part 46a is threadedly engaged with a male screw part 45a of the screw shaft 45.

The motor 41 is arranged between both upper rails 20 and controlled to be capable of forward and reverse rotations. The reduction mechanism 43 is associated with the output shaft 41a of the motor 41. The reduction mechanism 43 consists of a plurality of gears (not illustrated).

Next, the assembly process of the seat slide device 1 will be described.

First, it is performed to fittingly insert the fixing claws 38 into the fixing holes 13 while inserting the restriction protrusions 39 into the restriction holes 14, thereby fixing the slide contact members 30A to the lower sidewalls 11b. Next, it is performed to insert the female-screw member 46, with which the screw shaft 45 is threadedly engaged, into the lower rail 10 and fix the female-screw member 46 to the lower rail 10 by the fixing bolt 50. Next, it is performed to assemble the shaft supporting plates 44 to both ends of the screw shaft 45 so that the screw shaft 45 is supported by the upper rail 20 through the shaft supporting plates 44 and further fit the upper rail 20 to the lower rail 10. Then, it is performed to associate the reduction mechanism 43 with the screw shaft 45 while assembling the former to the upper rail 20.

With above-mentioned constitution, when a passenger operates the seat slide device 1, the motor 41 is driven to rotate the output shaft 41a, so that the screw shaft 45 is rotated through the reduction mechanism 43. Since the female-screw member 46 threadedly engaging with the screw shaft 45 is fixed to the lower rail 10, the upper rail 10 pivotally supporting the screw shaft 45 moves along the longitudinal direction of the lower rail 10 (i.e. the front-rear direction of the vehicle) together with a seat (not illustrated) by rotation of the screw shaft 45.

With this constitution mentioned above, by respectively arranging the lower column part 34 and the upper column part 35 of the sliding contact member 30A between the lower downside circular part 11e and the upper downside inclined wall 21c and between the lower upside circular part 11f and the upper upside inclined wall 21d along the longitudinal direction, the sliding contact members 30A as the friction reducing member 30 can be employed for the upper rail 20 and the lower rail 10 corresponding to guide balls (later mentioned as its modification). Consequently, since two friction reducing members different in constitution have compatibility therebetween, it is possible to reduce the types of the lower rail 10 and the upper rail 20 to be managed.

As the provision of the slits 37a allows the lower column part 34 and the upper column part 35 to bend in the region of each slit 37a and consequently, variations in the clearance between the lower downside circular part 11e and the upper downside inclined wall 21c and the clearance between the lower upside circular part 11f and the upper upside inclined wall 21d are absorbed, it is possible to further reduce the sliding resistance between the rails.

By providing the friction reducing dents 36 in the region of the sliding contact member 30A abutting on the upper rail 30, the contact area between the sliding contact member 30A and the upper rail 20 can be reduced. As a result, it is possible to promote the reduction of the sliding resistance.

With the constitution where: the radius R34 of the lower column part 34 is set smaller than the curvature radius R11e of the lower downside circular part 11e; the radius R35 of the upper column part 35 is set smaller than the curvature radius R11f of the lower upside circular part 11f; and the connection point C1 between the connection part 37 and the lower column part 34 and the connection point C2 between the connection part 37 and the upper column part 35 are distant from the lower sidewall 11b, variation in the clearance between the lower rail 10 and the upper rail 20 can be absorbed by deflection of the connection points C1 and C2.

Since the contact point P1 between the lower downside circular part 11e and the lower column part 34, the center O34 of the lower column part 34, and the contact point P2 between the lower column part 34 and the upper downside inclined wall 21c are in alignment with each other and furthermore, the contact point P3 between the lower upside circular part 11f and the upper column part 35, the center O35 of the upper column part 35, and the contact point P4 between the upper column part 35 and the upper upside inclined wall 21d are in alignment with each other, the upper rail 20 is capable of sliding in the lower rail 10 without rattling and with stability.

Note, although the constitution of applying present application to the electrically-operated seat slide device 1 has been described in the first embodiment, present application can be also applied to a manual seat slide device and then, the similar effect could be produced.

(Second Embodiment)

A seat slide device for vehicle according to a second embodiment will be described with reference to FIGS. 4, 5A, 5B, and 6A to 6D.

Figure 4:
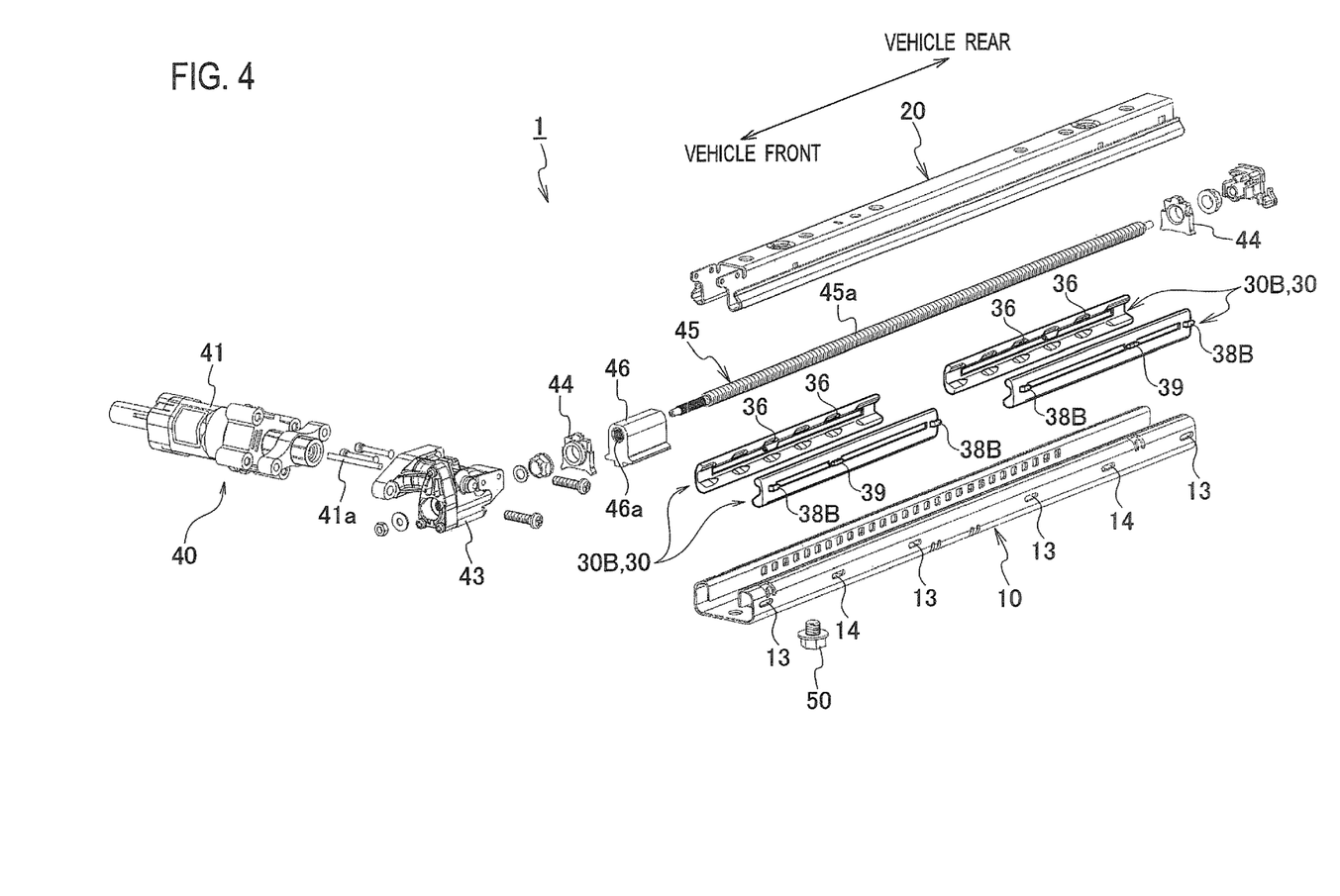
FIG. 4 is an exploded perspective view illustrating the seat slide device according to a second embodiment where sliding contact members are employed as the friction reducing member.
Figures 5A, 5B:
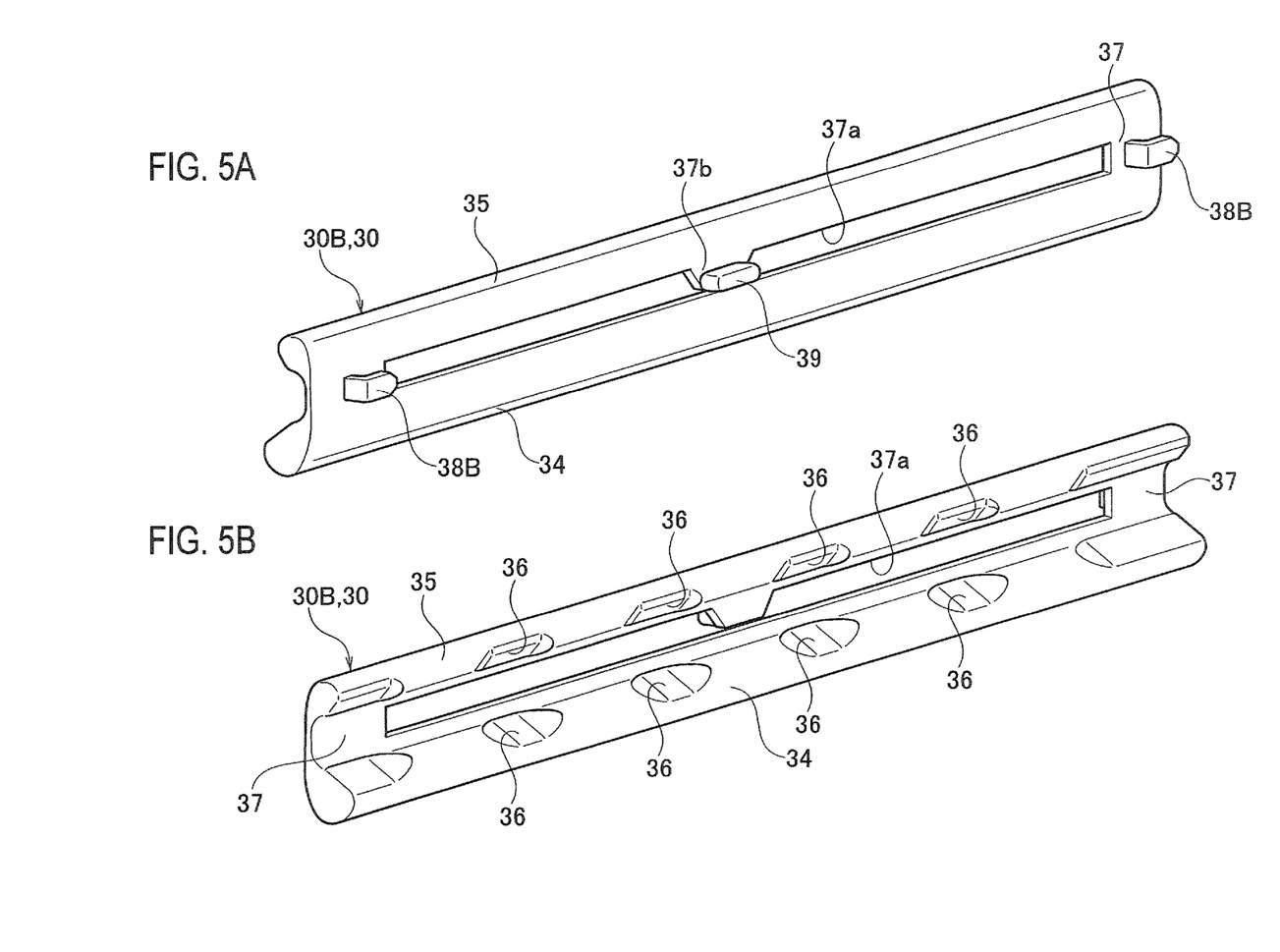
FIG. 5A is a perspective view illustrating an outside of the sliding contact member of the seat slide device according to the second embodiment.
FIG. 5B is a perspective view illustrating the inside of the sliding contact member of the seat slide device according to the second embodiment.
Figures 6A, 6B:
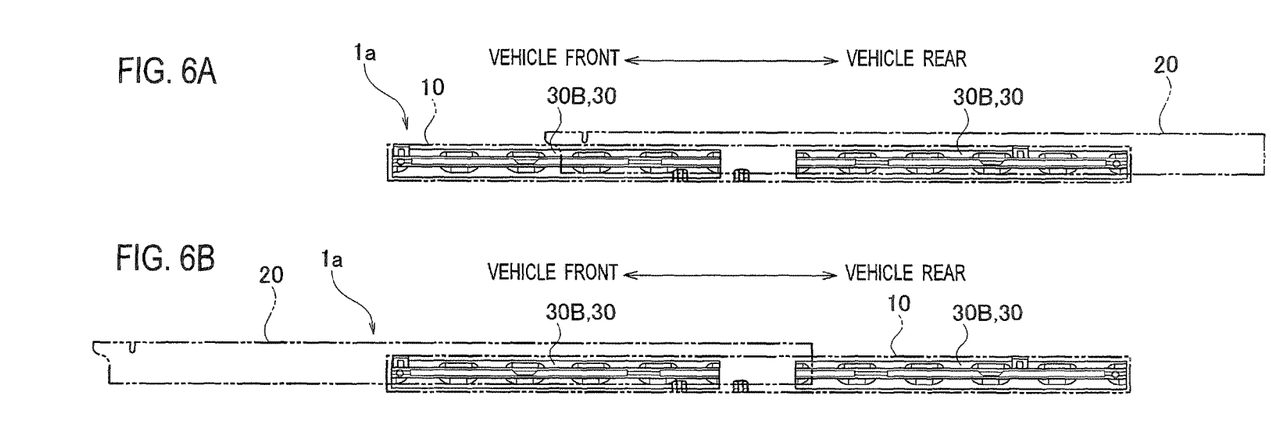
FIG. 6A is a typical view of an assembly where the friction reducing members are arranged in the longest lower rail in length, while the upper rail is positioned on the front side of a vehicle.
FIG. 6B a typical view of the assembly where the friction reducing members are arranged in the longest lower rail in length, while the upper rail is positioned on the rear side of the vehicle.
Figure 6C:
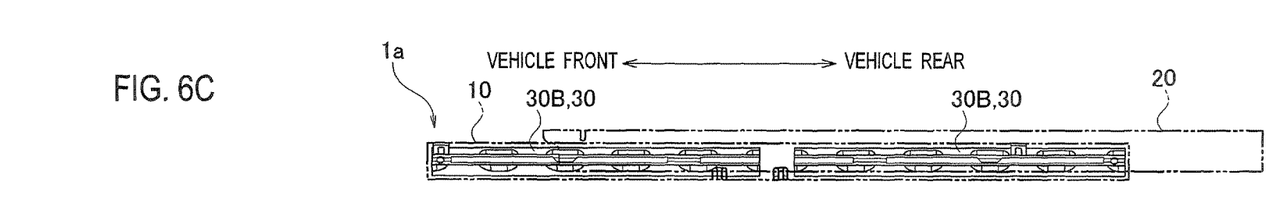
FIG. 6C a typical view of the assembly where the friction reducing members are arranged in the shortest lower rail in length, while the upper rail is positioned on the front side of the vehicle.
Figure 6D:
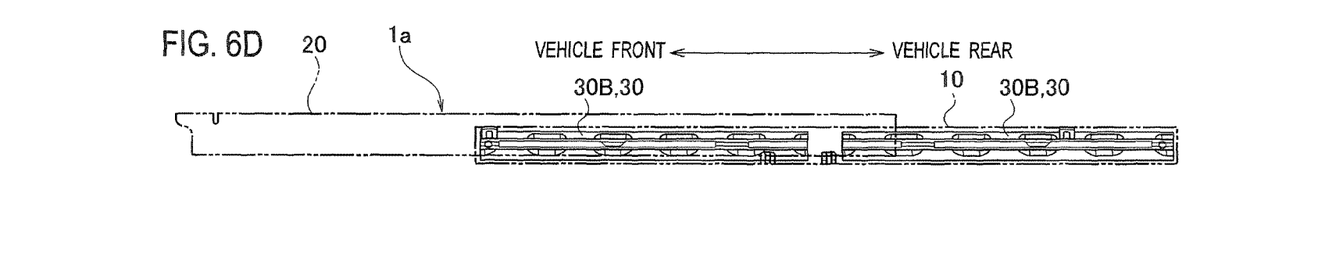
FIG. 6D is a typical view of the assembly where the friction reducing members are arranged in the shortest lower rail in length, while the upper rail is positioned on the rear side of the vehicle.

In the second embodiment, element similar to those of the first embodiment are indicated with the same reference numerals and their detailed descriptions are eliminated. In comparison with the vehicle seat slide device according to the first embodiment, the vehicle seat slide device according to the second embodiment greatly differs by the constitution of sliding contact members 30B as the friction reducing member 30.

In each of the sliding contact members 30B, its total length is set less than a half of the total length of a lower rail 10 whose total length is the shortest one of the lower rails 10 having various total lengths, which are managed by the manufacturer. That is, the friction reducing member 30 is divided into two sliding contact members 30B of the same shape, which are assembled to the front and rear sides of the lower rail 10 respectively. Then, as the lower rail 10 has a linear symmetrical profile with the symmetric axis X, the sliding contact members 30B of the same shape are settled on both lower sidewalls 11b. Concretely, in the first embodiment, the sliding contact members 30A of the same shape are mounted one assembly 1a (two members in total: one with respect to each lower sidewall 11b). In the second embodiment, however, the sliding contact members 30B of the same shape are settled on each lower sidewall 11b, two by two (four members in total).

The cross sectional shapes of the upper column part 35 and the lower column part 34, which constitute the sliding contact member 30B, are set the same as those of the first embodiment. The connection parts 37 connecting the upper column part 35 with the lower column part 34 are settled only at both ends of the sliding contact member 30B. Each of the connection part 37 is provided, in the region facing the lower sidewall 11b, with a fixing protrusion 38B (fitting part). The fixing protrusion 38 consists of an L-shaped protrusion. By fittingly inserting the fixing protrusions 38B into the fixing holes 13 penetrating through the lower sidewall 11b, both ends of the sliding contact member 30B are fixed onto the lower sidewall 11b. A restriction pedestal 37b is provided in a region of the upper column part 35, which is positioned at the intermediate part of the slit 37a. The restriction pedestal 37b is provided with a restriction protrusion 39.

Next, the assembly process of the assembly 1a will be described.

First, it is performed to slide the fixing protrusions 38B to the longitudinal direction of the lower rail 10 while inserting tips of the fixing protrusions 38B into the fixing holes 13 and further insert the restriction protrusion 39 into the restriction hole 13. With the restriction protrusion 39 inserted into the restriction hole 14, the displacement of the sliding contact member 30B is restricted under condition that the L-shaped fixing protrusions 38B engage with the fixing holes 13, so that the sliding contact member 30B is supported on the lower sidewall 11b.

With the constitution of the second embodiment, besides the effects resulting from the constitution of the first embodiment, by setting the total length of the sliding contact member 30B less than a half of the total length of a lower rail 10 whose total length is the shortest one of the lower rails 10 having various total lengths, which are managed by the manufacturer, it is possible to also apply the sliding contact member 30B to the lower rail 10 having the longest full length, which is managed by the manufacturer. Consequently, it becomes possible to provide one kind of friction reducing member 3 allowing suitability to lower rails having various total lengths, thereby realizing the commonality of components.

Additionally, since the sliding contact members 30B are assembled to both front and rear sides of the lower rail 10 respectively, an area free of the sliding contact member 30B could be defined at the central part of the lower rail 10 depending on its dimension, as illustrated in FIGS. 6A to 6D. Even in such a case, as they are arranged at a "front-side" sliding contact end and a "rear-side" sliding contact end with which the upper rail 20 and the lower rail 10 are brought into slide contact, it becomes possible to deal with lower rails having a variety of total lengths. For this reason, the commonality of components can be accomplished while suppressing an occurrence of rattling between the lower rail 10 and the upper rail 20.

Owing to the provision of the connection parts 37 on both ends of the sliding contact member 30B, the deflection of both column parts 34, 35 is realized to allow for adjustment of the interval between both column parts 34, 35.

With the constitution where the sliding contact member 30B is assembled to the lower rail 10 by fittingly inserting the restriction protrusion 39 into the restriction hole 14 while fittingly inserting the L-shaped fixing protrusions 38 into the fixing holes 13, it is possible to prevent the sliding contact member 30B from moving after assembling. Thus, with such a relatively simple structure, it is possible to prevent the fall of the friction reducing member and also possible to improve the assembling workability.

Figure 7A:
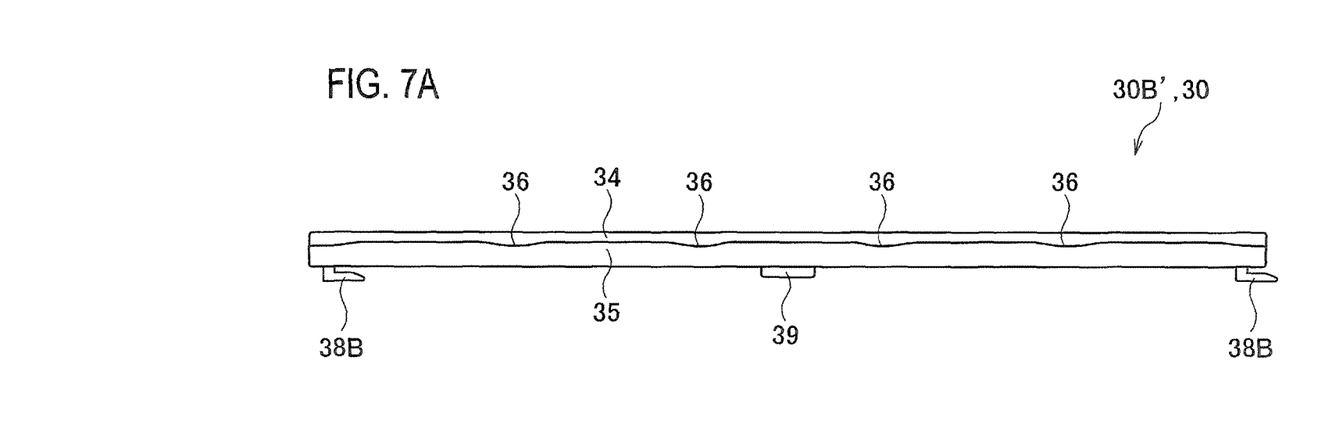
FIG. 7A is a plan view of a sliding contact member of a seat slide device according to a modification the second embodiment.
Figure 7B:
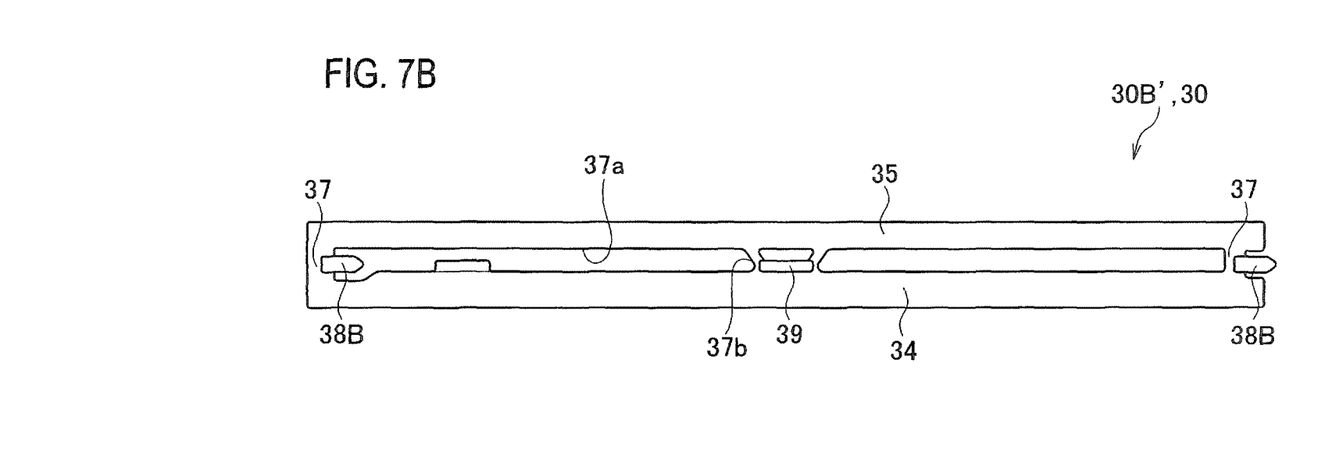
FIG. 7B is a side view of the sliding contact member of the seat slide device according to the modification of the second embodiment.

Further, a sliding contact member 30B' of a modification illustrated in FIGS. 7A and 7B may be adopted in place of the sliding contact member 30B of the second embodiment. The sliding contact member 30B' of the modification differs from the above-mentioned sliding contact member 30B in that the restriction pedestal 37b is formed so as to connect with the lower column part 34 and the upper column part 35. Note, in the modification, elements similar to those of the second embodiment are indicated with the same reference numerals and their descriptions are eliminated. The effect obtained by the sliding contact member 30B' of the modification is similar to that of the second embodiment.

(Third Embodiment)

Figure 8:
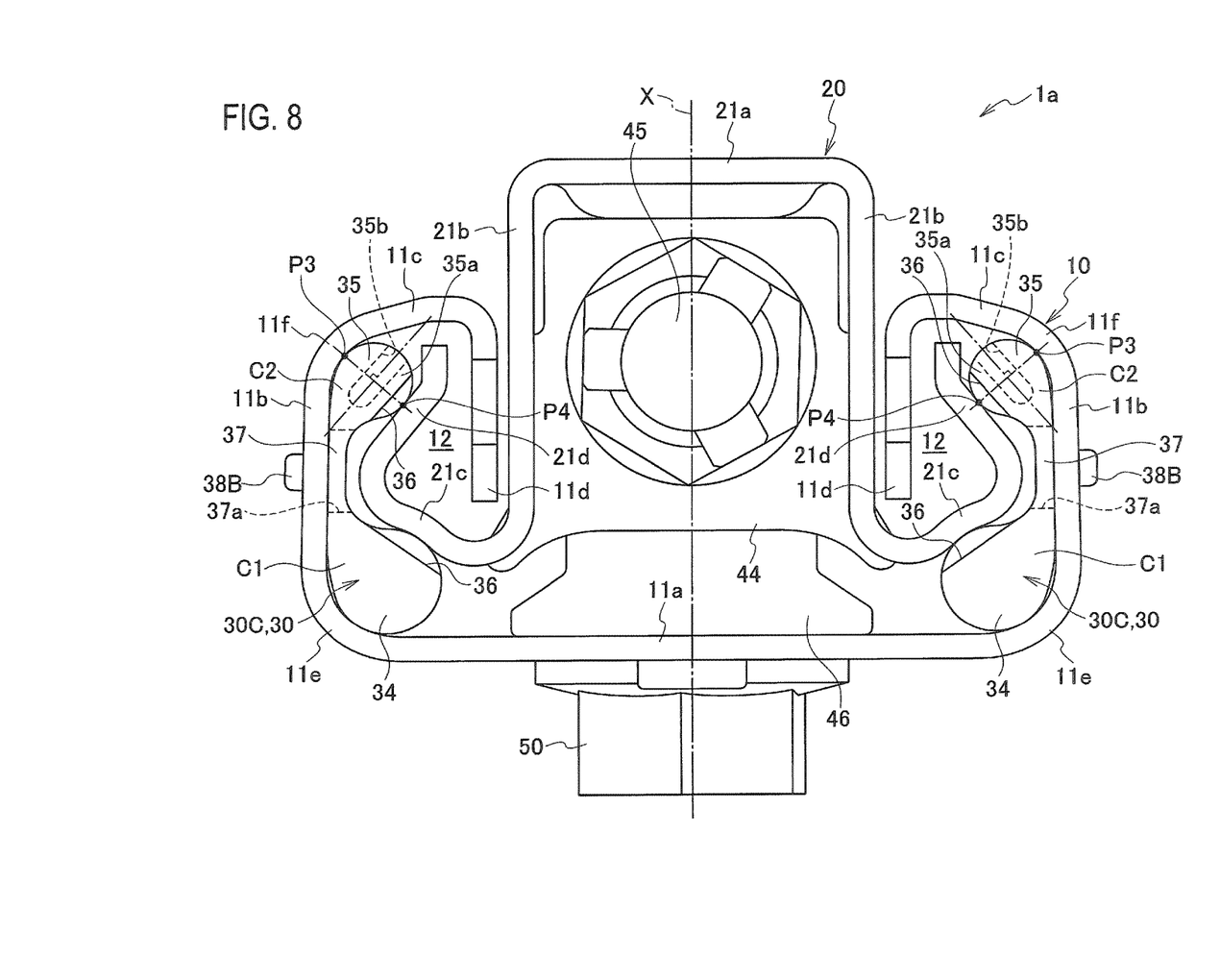
FIG. 8 is a side view of an assembly where sliding contact members are employed as the friction reducing member, illustrating a seat slide device according to a third embodiment.
Figure 9:
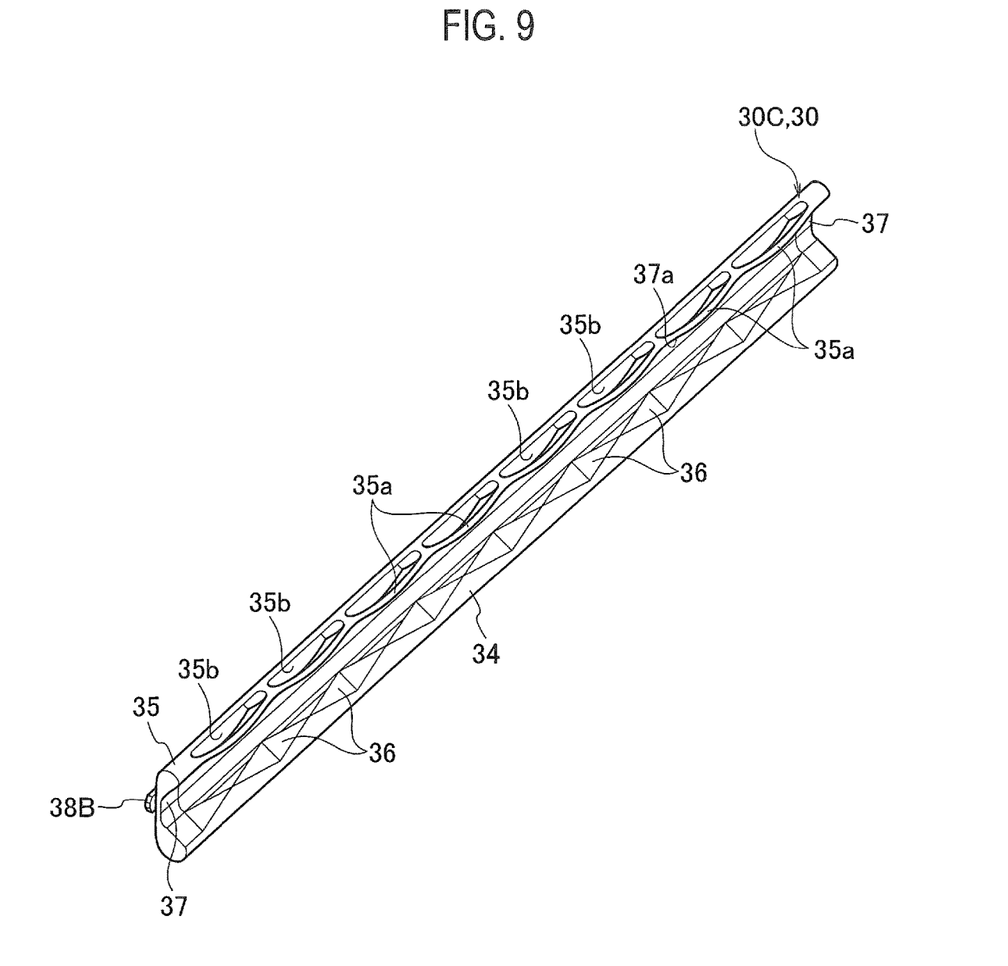
FIG. 9 is a perspective view illustrating the sliding contact member of the seat slide device according to the third embodiment.

A seat slide device for vehicle according to a third embodiment will be described with reference to FIGS. 8 and 9.

In the third embodiment, elements similar to those of the first and second embodiments are indicated with the same reference numerals and their descriptions are eliminated. In comparison with the vehicle seat slide devices according to the first and second embodiments, the vehicle seat slide device according to the third embodiment greatly differs by the constitution of a sliding contact member 30C as the friction reducing member 30. The sliding contact member 30C of the third embodiment differs from the sliding contact member 30B of the second embodiment in that elastic adjustment parts 35a are provided in the upper column part 35 and the other constitution is similar to that of the sliding contact member 30B of the second embodiment.

The elastic adjustment parts 35a are provided in each region abutting on the upper upside inclined wall 21a between the adjoining friction reducing dents 36. Each of the elastic adjustment parts 35a is composed of a recess 35b in the form of an upward-opening cavity along a direction perpendicular to a line connecting the contact point P3 between the lower upside circular part 11f and the upper column part 35 with the contact point P4 between the upper upside inclined wall 21d and the upper column part 35. By sculpting the back side of a region of the upper column part 35 abutting on the upper upside inclined wall 21d, each of the elastic adjustment parts 35a is bent and deformed when it abuts on the upper upside inclined wall 21d, demonstrating appropriate resilience. Since the upper column part 35 is elastically deformed in accordance with the clearance between the sliding upper rail 20 and the lower upside circular part 11f, the deflection of the upper rail 20 is mitigated to reduce the sliding resistance of the upper rail 20.

With the constitution of the third embodiment, besides the effects resulting from the constitutions of the first and second embodiments, since the elastic adjustment parts 35a are elastically deformed in accordance with a clearance between the sliding upper rail 20 and the lower rail 10, it is possible to abolish the process of selectively assembling an appropriate friction reducing member 30 so as to correspond to the clearance between the upper rail 20 and the lower upside circular part 11f and also possible to reduce the types of friction reducing members to be managed.

It is noted that if an appropriate friction reducing member 30 is not selectively assembled without providing the elastic adjustment member 35a, the clearance between the upper rail 20 and the lower rail 10 is adjusted by deflection of the upper rail 20, producing great sliding resistance.

As for the shape of the recess 35b, it is not limited to the shape illustrated in the third embodiment, as long as the back side of the region of the upper column part 35 abutting on the upper upside inclined wall 21d is sculpted so as to have appropriate resilience. For instance, it may be provided with a concave shape which results from removing all the back side of the region of the upper column part 35 abutting on the upper upside inclined wall 21d, and the same effect as this embodiment could be realized.

(Modification)

Figure 10:
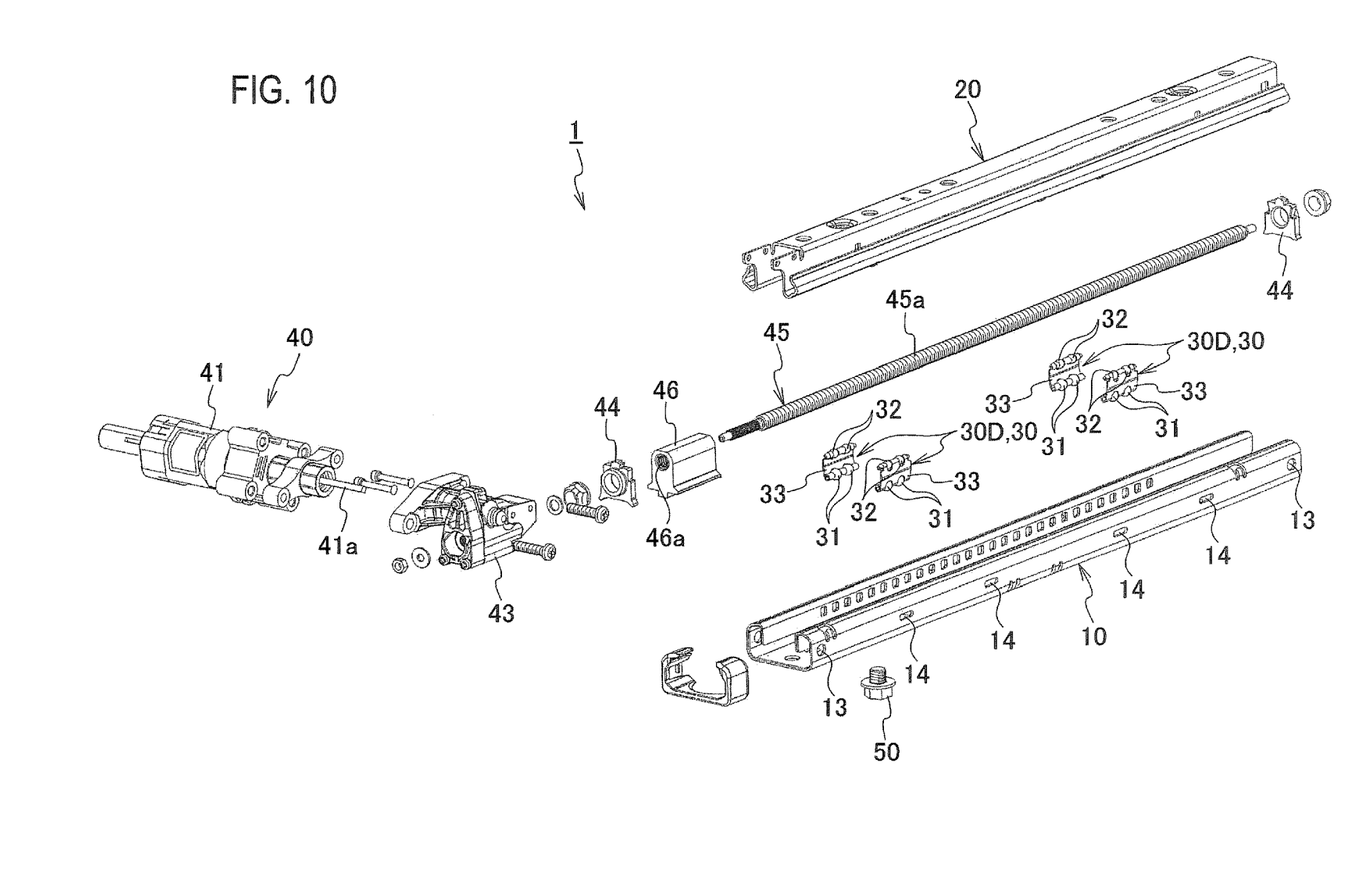
FIG. 10 is an exploded perspective view illustrating a seat slide device according to a modification of the first embodiment where guide balls are employed as the friction reducing member.
Figure 11:
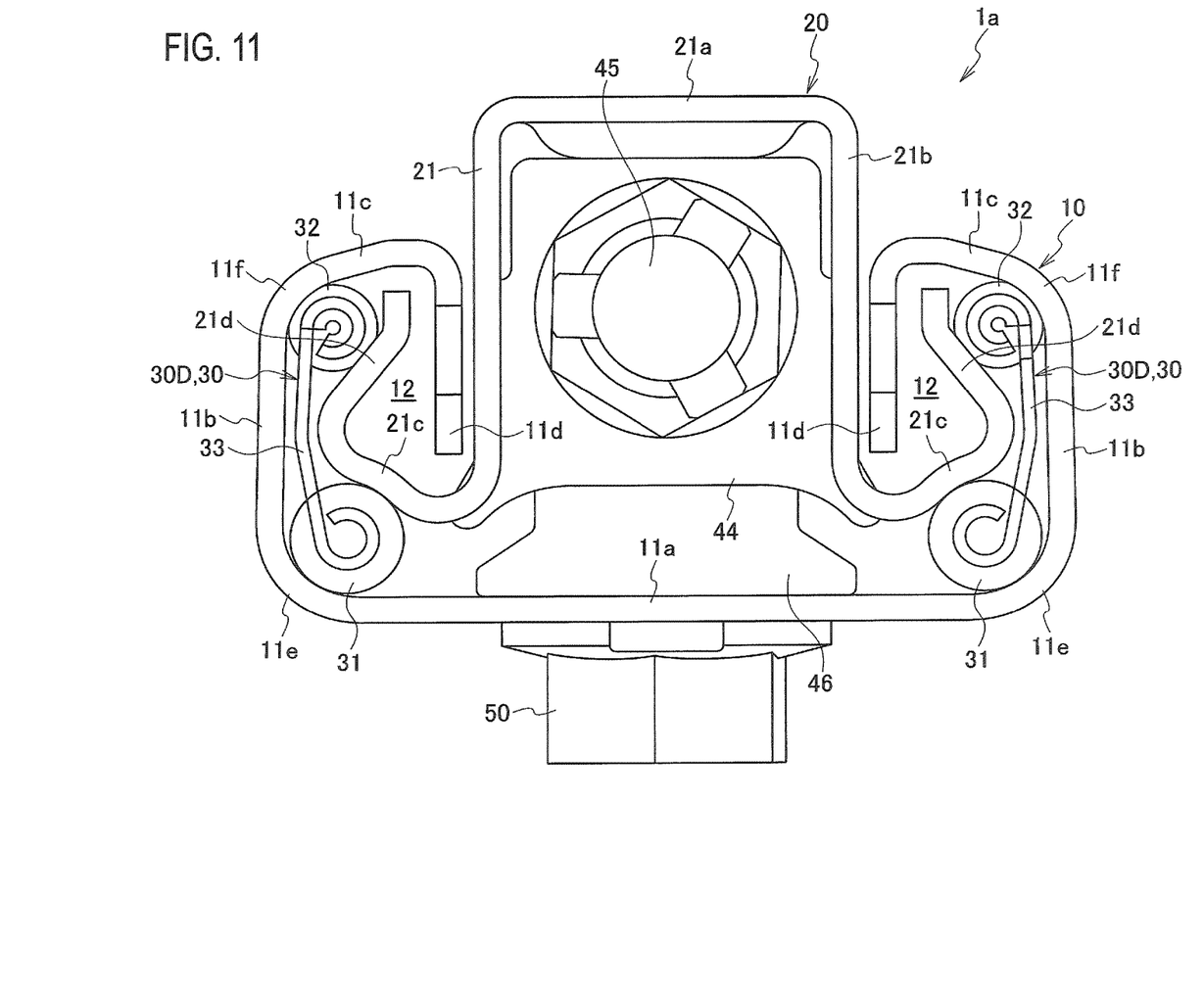
FIG. 11 is a side view of an assembly where the guide balls are employed as the friction reducing member, illustrating the seat slide device according to the modification of the first embodiment.

Although the seat slide device 1 according to the first embodiment employs the sliding contact member 30A as the friction reducing member 30, guide balls 30D may be alternatively adopted like the modification illustrated in FIGS. 10 and 11.

Each of the guide balls 30D includes lower guide balls 31 and upper guide balls 32 both composed of metallic round balls, and a retainer 33 for supporting the lower guide balls 31 between the lower downside circular part 11e and the upper downside inclined wall 21c rollably and also supporting the upper guide balls 32 between the lower upside circular part 11f and the upper upside inclined wall 21c rollably.

In each of the guide balls 30D of the modification, each of the lower guide balls 31 is set to have the same diameter as the lower column part 34 of the first embodiment, while each of the upper guide balls 32 is set to have the same diameter as the upper column part 35 of the first embodiment. In other words, the diameter of the lower guide ball 31 is set larger than the diameter of the upper guide ball 32.

The retainer 33 supports two each for the lower guide ball 31 and the upper guide ball 32, four balls in total. Then, these guide balls 30D are arranged in an accommodation part 12 surrounded by the lower sidewall 11b, the lower top wall 11c and the lower inner wall 11d, at two sites both in front and in the rear, that is, four sets of the guide balls 30D in total are arranged for one assembly 1a.

Next, the assembly process in case of selecting the guide balls 30D will be described.

First, it is performed to insert the female-screw member 46, with which the screw shaft 45 is threadedly engaged, into the lower rail 10 and successively fix the female-screw member 46 onto the lower rail 10 by the fixing bolt 50. Next, the guide balls 30D are interposed between the upper rail 20 and the lower rail 10 while inserting the upper rail 20 into the lower rail 10. Next, it is performed to assemble the shaft supporting plates 44 to both ends of the screw shaft 45 so that the screw shaft 45 is supported by the upper rail 20. Then, it is performed to associate the reduction mechanism 43 with the screw shaft 45 while assembling the reduction mechanism 43 to the upper rail 20. Additionally, it is performed to associate the output shaft 41a of the motor 41 with the reduction mechanism 43.

What is claimed is:

1. A seat slide device for a vehicle, comprising:
   a lower rail comprising:
      a lower bottom wall having a rectangular shape extending in a front-rear direction of the vehicle;
      a pair of lower sidewalls standing from both edges of the lower bottom wall in a width direction of the vehicle upwardly through lower downside partially circular parts;
      a pair of lower top walls each extending from an upper edge of each of the lower sidewalls toward the opposing lower sidewall through a lower upside partially circular part formed by a circular surface, substantially in parallel with the lower bottom wall; and
      a pair of lower inner walls suspending from respective inner edges of the lower top walls downwardly;
   an upper rail comprising:
      an upper top wall having a rectangular shape extending in the front-rear direction of the vehicle;
      a pair of upper sidewalls suspending from both edges of the upper top wall in the width direction of the vehicle downwardly;
      a pair of upper downside inclined walls standing from lower edges of the upper sidewalls obliquely upward and outward; and a pair of upper upside inclined walls standing from top edges of the upper downside inclined walls toward the upper sidewalls obliquely upward, wherein the upper downside inclined walls and the upper upside inclined walls are arranged so as to be movable in the lower rail along the front-rear direction of the vehicle under condition that the upper downside inclined walls face the lower downside partially circular parts, while the upper upside inclined walls are facing the lower upside partially circular parts; and a friction reducing member arranged between the lower rail and the upper rail, the friction reducing member comprising one or more sliding contact members, each of the sliding contact members comprising:

a lower column part consisting of a columnar member arranged between the lower downside partially circular part and the upper downside inclined wall along a longitudinal direction;

an upper column part consisting of a columnar member arranged between the lower upside partially circular part and the upper upside inclined wall along the longitudinal direction; and one or more connection parts connecting the upper column part with the lower column part, wherein the friction reducing member is provided with a fitting part and a restriction protrusion both protruding toward the lower sidewall, the lower sidewall is provided with a through-hole fittable to the fitting part and a restriction hole fittable to the restriction protrusion, the fitting part includes an L-shaped protrusion extending in the longitudinal direction of the lower rail, the through-hole is a hole which penetrates through the lower sidewall and into which the fitting part can be fittingly inserted, and by sliding the friction reducing member with the fitting part inserted into the through-hole, in the longitudinal direction of the lower rail, the L-shaped fitting part is engaged with a marginal part of the through-hole, while the restriction protrusion is fittably opposed to the restriction hole.

2. The seat slide device according to claim 1, wherein the friction reducing member is formed, between the lower column part and the upper column part, with a slit in the form of an elongated hole along the longitudinal direction.

3. The seat slide device according to claim 2, wherein the slit is formed so as to be the elongated hole by at least a pair of the connection parts connecting the upper column part with the lower column part.

4. The seat slide device according to claim 1, wherein the lower column part is formed, at its region abutting on the upper downside inclined wall, with a plurality of first friction reducing dents which are dented so as to depart from the upper downside inclined wall, at predetermined intervals along the longitudinal direction, and the upper column part is formed, at its region abutting on the upper upside inclined wall, with a plurality of second friction reducing dents which are dented so as to depart from the upper upside inclined wall, at predetermined intervals along the longitudinal direction.

5. The seat slide device according to claim 1, wherein the friction reducing member is formed with a length less than a half of the dimension of the lower rail in the longitudinal direction and also arranged in front and rear pairs in the longitudinal direction of the lower rail.

6. The seat slide device according to claim 1, wherein the through-hole and the restriction hole are set so that their dimensions in the longitudinal direction of the lower rail are substantially equal to each other.

7. The seat slide device according to claim 1, wherein a radius of the lower column part is set smaller than a curvature radius of the lower downside partially circular part, a contact point between the lower downside partially circular part and the lower column part, a center of the lower column part, and a contact point between the lower column part and the upper downside inclined wall are positioned in alignment with each other, a radius of the upper column part is set smaller than a curvature radius of the lower upside partially circular part, a contact point between the lower upside partially circular part and the upper column part, a center of the upper column part, and a contact point between the upper column part and the upper upside inclined wall are positioned in alignment with each other, and a connection point between the connection part and the lower column part and a connection point between the connection part and the upper column part are distant from the lower sidewall.

8. The seat slide device according to claim 1, wherein the upper column part is formed, behind its region abutting on the upper upside inclined wall, with an elastic adjustment part consisting of a recess.

* * * * *